United States Patent
Simmons

(10) Patent No.: US 7,146,770 B2
(45) Date of Patent: Dec. 12, 2006

(54) ANGLE-SECTION COLUMN-BEAM CONNECTOR

(76) Inventor: Robert J. Simmons, 27308 Fairview Ave., Hayward, CA (US) 94542

( * ) Notice: Subject to any disclaimer, the term of this patent is extended or adjusted under 35 U.S.C. 154(b) by 0 days.

(21) Appl. No.: 10/699,716

(22) Filed: Nov. 3, 2003

(65) Prior Publication Data

US 2004/0088944 A1   May 13, 2004

Related U.S. Application Data

(60) Provisional application No. 60/424,080, filed on Nov. 5, 2002.

(51) Int. Cl.
*E04B 1/38* (2006.01)
*F16B 9/00* (2006.01)

(52) U.S. Cl. ............ 52/236.6; 52/236.7; 403/245

(58) Field of Classification Search ............ 52/236.3, 52/236.7, 283, 263, 236.6, 234, 655.1, 653.1, 52/712; 403/186, 263, 245, 237; 182/179
See application file for complete search history.

(56) References Cited

U.S. PATENT DOCUMENTS

| | | | | |
|---|---|---|---|---|
| 683,443 A | * | 10/1901 | Cooley | ............ 52/234 |
| 925,677 A | | 6/1909 | Belcher | |
| 1,135,721 A | * | 4/1915 | Robinson | ............ 264/34 |
| 1,315,016 A | | 9/1919 | Foster | |
| 1,510,082 A | * | 9/1924 | Aarsrud | ............ 249/16 |
| 1,729,743 A | | 10/1929 | Jorgensen et al. | |
| 1,977,715 A | | 10/1934 | Coleman | |
| 2,182,593 A | * | 12/1939 | Levene | ............ 52/262 |
| 2,341,993 A | * | 2/1944 | Jennings | ............ 249/195 |
| 2,947,390 A | | 8/1960 | Stollenwerk | |
| 3,327,438 A | * | 6/1967 | Cooper | ............ 52/205 |
| 3,706,169 A | | 12/1972 | Rensch | |
| 4,545,793 A | * | 10/1985 | Shuler | ............ 55/355 |
| RE33,220 E | * | 5/1990 | Collier | ............ 52/263 |
| 5,291,716 A | * | 3/1994 | Broberg et al. | ............ 52/745.03 |
| 5,471,810 A | | 12/1995 | Sugisawa et al. | |
| 5,678,375 A | * | 10/1997 | Juola | ............ 52/655.1 |
| 5,960,598 A | * | 10/1999 | Tamlyn | ............ 52/254 |
| 6,112,472 A | * | 9/2000 | Van Dyk et al. | ............ 52/36.1 |
| 6,295,764 B1 | * | 10/2001 | Berridge et al. | ............ 52/36.5 |
| 2002/0059774 A1 | * | 5/2002 | Collins | ............ 52/690 |

(Continued)

FOREIGN PATENT DOCUMENTS

DE         295 18 886 U1    8/1996

(Continued)

*Primary Examiner*—Robert Canfield
*Assistant Examiner*—Gay Ann Spahn
(74) *Attorney, Agent, or Firm*—Jon M. Dickinson, PC; Robert D. Varitz, PC

(57) ABSTRACT

A column/beam interconnection employing angular connectors which wrap complementarily around an outside corner in a column. Each connector includes, on each of two, next-adjacent column faces, a cantilever-projecting deflectable tab which is nominally spaced from another, confronting tab that belongs to a next-adjacent connector. These confronting, spaced tabs freely receive between them the end of the central web in an I-beam, and when clamplingly secured to such a web, deflect under spring resistance to introduce useful compressive forces through the associated connectors into the associated column. The proposed connector arrangement allows, with respect to the placement of a beam for connection to and between a pair of next adjacent columns, for the vertical shifting of the beam into proper place for connection of its central web to and between pairs of spaced tabs, without any need for any lateral shifting of the columns to allow for insertion of the beam between the columns.

2 Claims, 2 Drawing Sheets

U.S. PATENT DOCUMENTS

| | | | |
|---|---|---|---|
| 2002/0088192 A1* | 7/2002 | Calixto | 52/396.04 |
| 2002/0095888 A1* | 7/2002 | Winskye | 52/234 |
| 2002/0116894 A1* | 8/2002 | Reid | 52/796.1 |
| 2002/0145100 A1* | 10/2002 | Flathau | 249/194 |
| 2003/0182873 A1* | 10/2003 | Clasen et al. | 52/73 |
| 2004/0194405 A1* | 10/2004 | Peacey et al. | 52/234 |

FOREIGN PATENT DOCUMENTS

| | | |
|---|---|---|
| FR | 2 471 461 | 12/1979 |
| FR | 2 613 403 | 10/1988 |

* cited by examiner

ANGLE-SECTION COLUMN-BEAM CONNECTOR

CROSS RELATED TO RELATED APPLICATION

This application claims priority to U.S. Provisional Patent Application, Ser. No. 60/424,080, filed Nov. 5, 2002 by Robert J. Simmons for "Angle-Section Column/Beam Connectors". The entire contents of that currently co-pending, prior-filed U.S. Provisional Application are hereby incorporated herein by reference.

BACKGROUND AND SUMMARY OF THE INVENTION

This invention pertains to a connector which is employed to connect a structural column and a structural beam, such as in a building-frame structure. In particular, it relates to such a connector, and to a clustered arrangement of connectors, employed at the nodal intersection between such a column and such a beam, which, when fastened appropriately to the outside of a column, wraps around one of the outside corners in the column, and when anchored appropriately to the central web in the end of a joining beam, cooperates with a companion connector which is wrapped around another adjacent outside corner in the column to introduce a useful compressive preload between the connector and the associated column. The connector of this invention is designed preferably for corner-weld attachment directly to the outside of a column, and the compressive preload which become uniquely introduced, as just mentioned, during connection of the end of a beam, functions to minimize shear loads which must otherwise be born more directly by the weld interface between the connector and a column.

Those skilled in the art of building frame construction will recognize that numerous approaches have been proposed in the past, and are currently conventionally employed, to interconnect upright columns and horizontally extending beams at the usual nodal interconnections that exist between such columns and beams in a building frame structure, such as the type typically employed in a multi-story building. Such interconnections must function securely to anchor the ends of beams to the outsides of columns, typically, and must be capable of carrying gravity (shear) loads, as well, in many instances, as different kinds of moment loads.

The present invention addresses the issue of providing for such an interconnection utilizing a novel angle-section connector which effectively wraps around the corner on the outside of a column, is corner-welded to a column when properly positioned in place, and, when attached to the central web in the end of a joining I-beam, in cooperation with a next-adjacent companion connector also constructed in accordance with the invention, functions to introduce a useful compressive preload directed from the outside inwardly toward the axis of the associated column, thus, to minimize the requirement that the weld interconnection between a column and connector carry and support any appreciable shear load. Rather, such a shear load, by virtue of employment of the connector of this invention, is dealt with handily through the tight and compressive interface which results, in accordance with the utility of this invention, between the connector of the invention and the outside surface of a column. Securement of a pair of next-adjacent connectors to the central web in a beam takes place through, typically, nut-and-bolt tightening of a pair of cantilevered, spring loadable projecting tabs in the connectors which straddle a beam's central web, and which are drawn, against resistive spring action, into tight contact with this web during tightening of appropriate nut-and-bolt fasteners. It is this cantilever spring resistance, and the elastic deflection which takes place in the mentioned tabs in the connectors which are deflected toward one another and into tight contact with a beam's central web during connection, which results in the mentioned inwardly directed compressive forces developing between a connector made in accordance with this invention and the surface of a column.

These and other features and advantages which are offered and attained by the invention will become more fully apparent as the description which now follows is read in conjunction with the accompanying drawings.

DETAILED DESCRIPTION OF THE INVENTION

Figure 3:
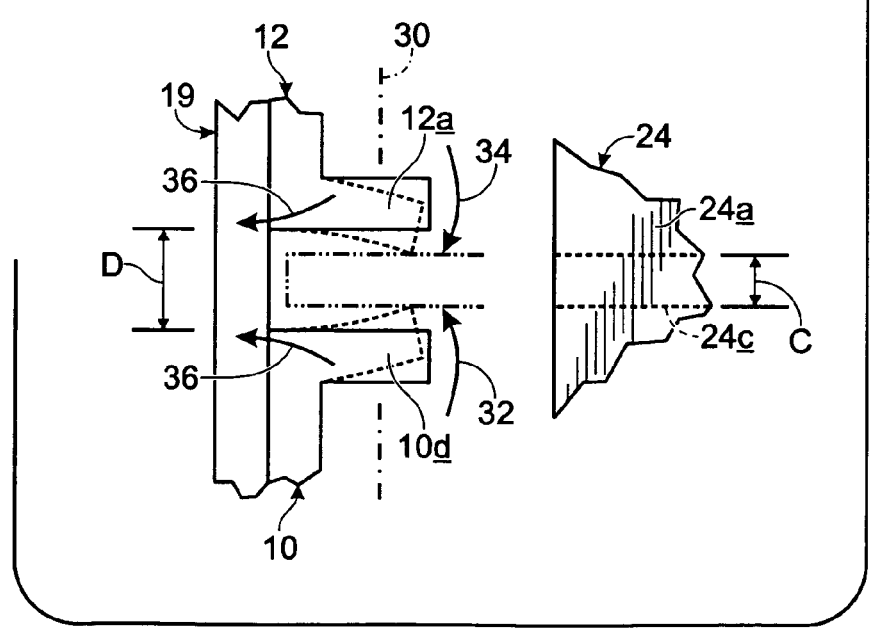
FIG. 3, which is drawn on a slightly larger scale than that employed in FIG. 2, fragmentarily illustrates a region in FIG. 2 wherein a specific interconnection is to take place between a pair of the illustrated connectors of the invention, and the mentioned nearby central web end of the beam also shown fragmentarily in FIG. 2.

Turning now to the drawings, and referring throughout the description herein effectively to all of the four drawing figures, illustrated therein are four angle-section column/beam connectors 10, 12, 14, 16 which are alike in construction, and each of which is constructed in accordance with a preferred and best mode embodiment of the invention. Only connectors 10 and 12 are specifically shown in FIG. 1, and only a fragment each of connectors 10 and 12 is shown in FIG. 3. These angle-section connectors are also referred to herein as multi-angular, load-conveying interface connector structure.

Figure 1:
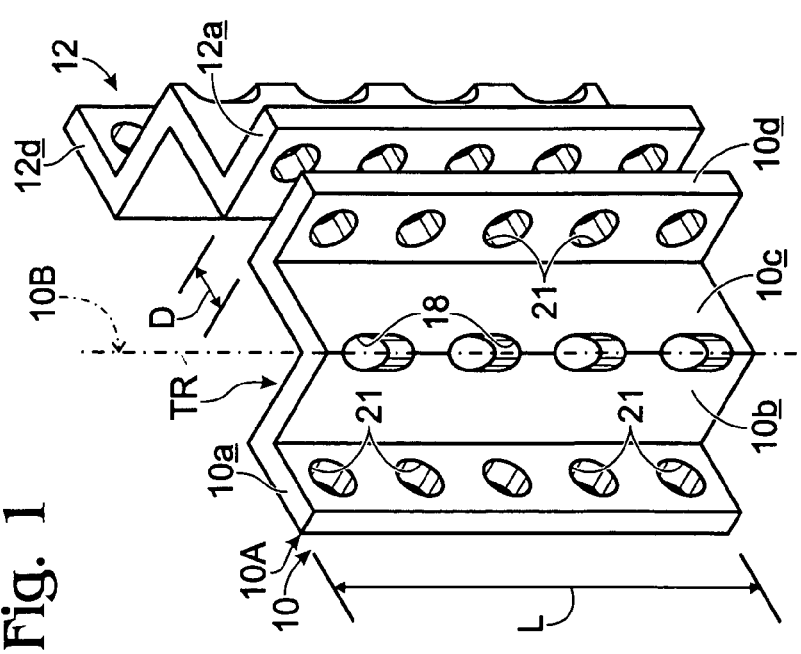
FIG. 1 is an isometric view illustrating a pair of angle-section connectors constructed in accordance with a preferred and best mode embodiment of the invention. These two connectors are shown isolated from other structure, and in relative, next-adjacent positions typical of those which they occupy during use, according to practice of the invention, for interconnecting an upright column and the central web of a horizontally extending beam. This preferred and best mode embodiment of the invention is described in a setting wherein it has been designed for use on and with respect to the outside of a square cross-section, hollow and tubular steel column.
Figure 2:
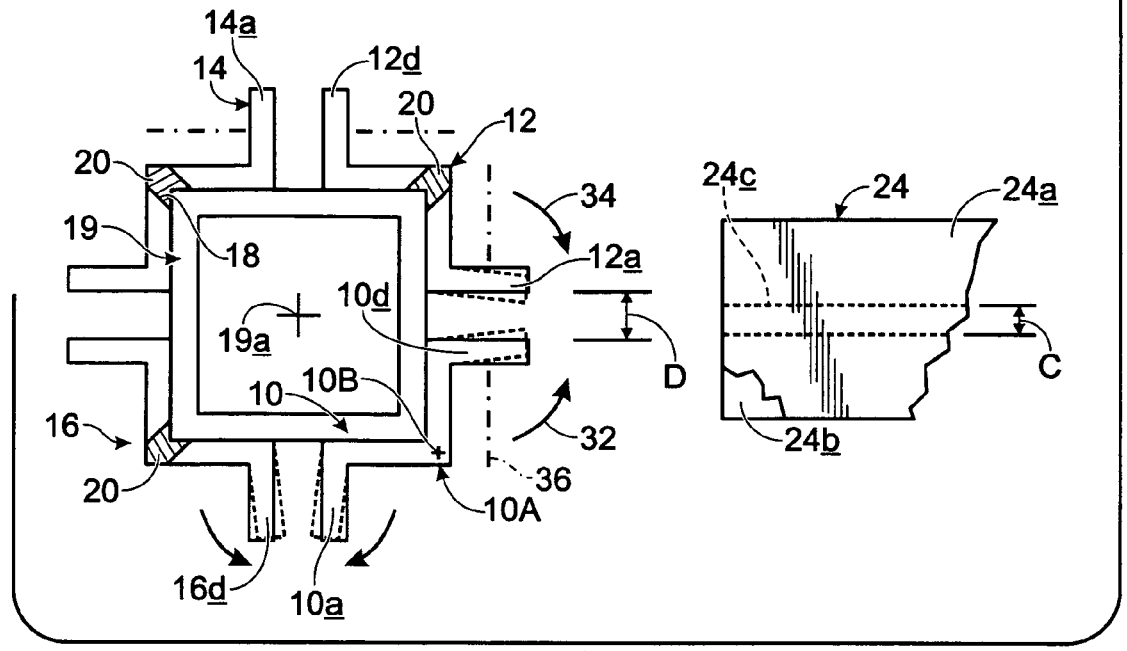
FIG. 2 is a view drawn on a slightly smaller scale than that which is employed in FIG. 1, illustrating fragmentarily, and from a plan point of view, a cluster, or arrangement, of angle-section connectors, such as the two connectors shown in FIG. 1, anchored as by welding in manners wrapping around the four corners of a square cross-section, hollow and tubular steel beam. Additionally, they are shown in relation to the fragmentarily shown nearby end of a structural I-beam which is to be connected to the illustrated column through a pair of tabs that form part of a pair of next-adjacent connectors like those shown in FIG. 2.

Describing the construction of each of these connectors with reference made only to features and characteristics of illustrative connector 10, each connector includes what is referred to herein as an elongate body, such as body 10A, which is referred to specifically as being elongate with respect to a long axis for this body which is shown by a dash-dot-line 10B (see especially FIGS. 1 and 2). Viewed along this long axis, as in FIG. 2, connector body 10A is seen to have what can be thought of as a zigzag, or generally W-shaped, cross-sectional configuration which is formed by four angularly relatively disposed planar expanses 10a, 10b, 10c, 10d. Expanses 10b, 10c, which form central expanses, or an angular central portion, in body 10A, are generally planar, and lie in planes which intersect one another, in the embodiment of the connector now being described, at an angle of about 90-degrees. These two central expanses form a V-shaped trough TR (see FIG. 1) whose function will be explained shortly.

Along what can be thought of as the ridge line of intersection between expanses 10b, 10c are plural through-passages seen at 18 in FIG. 1, which through-passages accommodate corner-weld attachment of the connector to an outside corner in a column.

Figure 4:
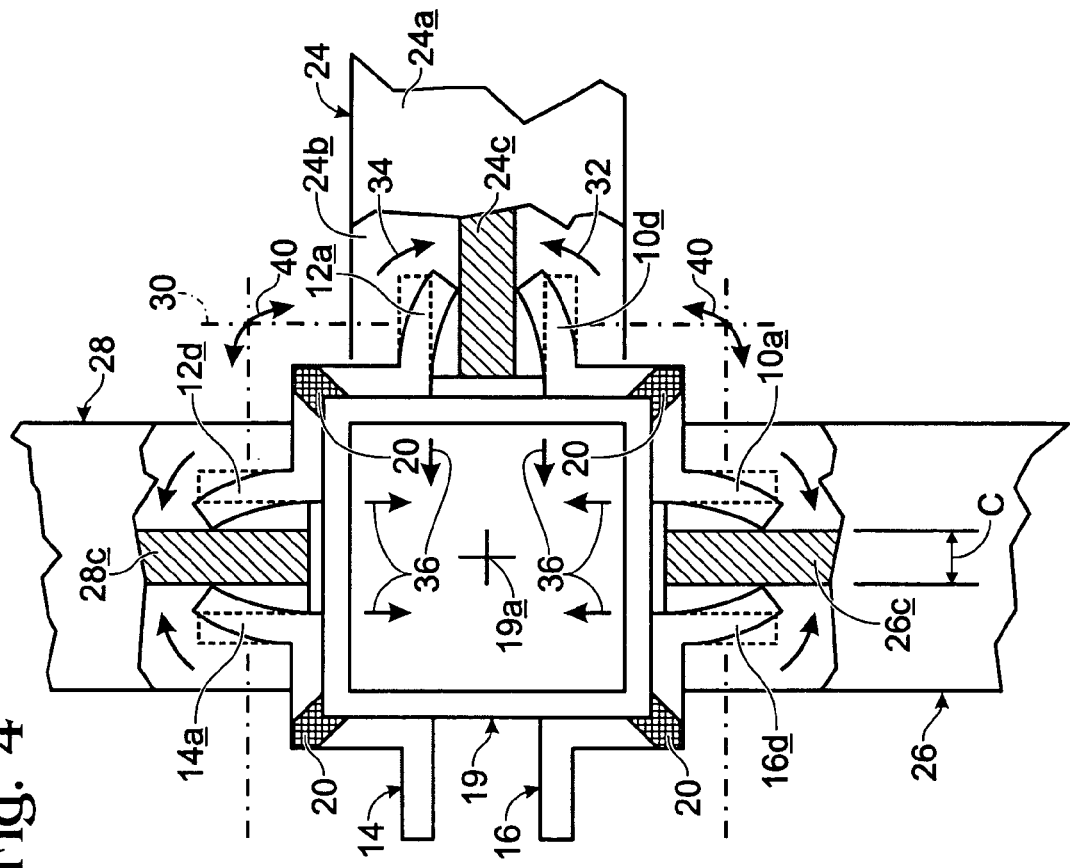
FIG. 4 is drawn, generally speaking, on a somewhat larger scale than that employed in FIG. 3, and is stylized view, with proportions and relevant positions of components exaggerated in order to illustrate, as clearly as possible, the cantilever spring-resistant action, and the development of inwardly (to a column) directed compressive forces which are associated with connections of the ends of three different fragmentarily shown beams to the column and connector arrangement pictured in FIGS. 2 and 3.

The specific connectors shown herein have been constructed, with respect to the configuration of trough TR, to fit and wrap complementarily as a corner wrap around the outside corner of a hollow, tubular, square-cross-section column, such as the column shown at 19 in FIGS. 2, 3 and 4. This column's long axis is shown at 19a. Very specifically, the right angle which defines trough TR is intended, thus, effectively to match the right angles which define the corners on the outside of column 19. Each such corner, of course, is the result of an intersection of two column faces, and the 90-degree intersection illustrated herein is referred to as a known angle. A connector, such as the four connectors shown herein, is secured as by welding to an outside corner of column 19 at a particular longitudinal location along the length of that column. Under circumstances where, for example, the ends of four I-beams are to be connected to the column at that longitudinal location along the column, a cluster arrangement of four successively next-adjacent connectors (in this instance connectors 10, 12, 14,16) is formed around the column at that location, with each connector appropriately corner-welded through passages, such as those shown at 18 for connector 10 in FIG. 1, to the appropriate outside corners of the column. In FIGS. 2 and 4, weld connections, which are illustrated as darkened regions, are shown generally at 20. In FIG. 2, no such weld connection is illustrated there for connector 10 in order to provide an opportunity to illustrate the location of previously mentioned long axis 10B of connector body 10A.

Continuing with a description of the characteristics of each of connectors 10, 12, 14, 16, and with specific reference still made to connector 10, joined angularly to the outer lateral extremities of expanses 10b, 10c are previously mentioned expanses 10a 10d, respectively, which are also generally planar expanses, and which are also referred to herein as tabs, or cantilever elements. Tabs 10a 10d, with respect to their nominal planes, are disposed at substantially right angles to the respective associated nominal planes of expanses 10b, 10c. A consequence of this arrangement is that, when a connector is attached to the outside corner (in a wrap-around sense) of a column, such as column 19, these tabs extend outwardly in a cantilever fashion away from the associated faces of that column at substantially right angles. This can clearly be seen in FIGS. 2–4, inclusive. Included in each of tabs 10a, 10d are five through-bores, such as those designated 21, which through-bores are arranged in a single, upright row.

It should be mentioned at this juncture that it is entirely possible for an angle-section connector made in accordance with the present invention to be designed with a different angle existing between its central expanses, such as between expanses 10b 10c in connector 10. The important consideration here is that this angle be chosen effectively to match the angle which defines or describes the outside corner of the particular column with respect to which the connector is intended to wrap when it is fitted and joined to that column. This angle, therefore, may be greater or lesser than 90-degrees, as appropriate. In all circumstances, no matter what the angle is that defines the angle of intersection between central expanses, like expanses 10b, 10c, it is important that the projecting tabs, such as tabs 10a, 10b, end up substantially lying in planes that are orthogonally disposed relative to the associated faces, or more specifically the nominal planes of the faces, of the associated column.

With connectors 10, 12, 14, 16 attached as by welding at essentially a common longitudinal location (a selected node) along the length of column 19, and before any connection is established with the central web in the end of a structural beam, extending outwardly from each outside face of the column are confronting spaced and substantially parallel tabs that reside in next-adjacent connectors. Thus, one can see, for example in FIGS. 2, 3, and 4, that tab 10a in connector 10 so faces a tab 16d in connector 16, and that tab 10d in connector 10 substantially so faces a tab 12a in connector 12. Nominally, a substantially uniform distance, or spacing, D exists between such confronting tabs before connection to a beam, and this nominal distance is clearly illustrated in FIGS. 1, 3 and 4 for tabs 10d, 12a. More will be said shortly about dimension D, which is also referred to herein as a nominal spacing having a first known dimension.

The connectors thus illustrated and described herein, and especially in the arrangement therefor pictured in FIGS. 2, 3 and 4, are designed to make connections between column 19 and the nearby ends of four different structural I-beams, such as the I-beams shown fragmentarily in FIGS. 2, 3 and 4 at 24, 26, 28. The arrangement pictured in FIG. 4 is also referred to herein as a column/beam interconnect arrangement.

These three beams, which are conventional I-beams herein, will now be generally described with specific reference made just to beam 24. Beam 24 includes upper and lower spaced and generally horizontal flanges 24a, 24b, respectively, which flanges are joined through a central generally planar elongate central web 24c. Web 24c has a substantially uniform thickness which is shown in FIGS. 2–4, inclusive, at C. Dimension C herein is also referred to as a second known dimension. As can be seen in these three figures, dimension C is noticeably less than previously mentioned dimension D which is the nominal spacing that exists between pairs of confronting tabs in connectors 10, 12, 14, 16. The specific sizes selected for dimensions C and D may be chosen to suit the particular frame structure which is to be built. According to a feature of the present invention, it is important that dimension D be somewhat larger than dimension C so that when a beam end is anchored between a pair of confronting connectors tabs, and in accordance with practice of the invention, elastic, cantilevered spring-resisted lateral deflection occurs in the tabs as they are drawn toward one another against the opposite faces of a beam's central web to tighten a connection being made between a beam end and the connector tabs. Preferably, this dimensional difference is also great enough to allow for sufficient initial "play" or clearance between the tabs and an extending beam central web end to accommodate another important characteristic of the present invention. This other characteristic, which is made visually evident in FIGS. 2–4, inclusive, is that the connection structure proposed by the present invention allows for the vertical shifting of an unconnected beam into the space between columns without having to introduce any opening-up of that space to allow for beam placement into a correct relative condition to enable connection. This is a significant construction convenience. This comes about because of the fact that the present invention enables column/beam interconnection in a setting where the overall length of a beam is no greater than the spacing between the spaced, confronting faces of the outsides of two, next-adjacent, properly vertically disposed and horizontally positioned columns.

In solid lines in FIG. 2, the various connector tabs are shown in their nominal spaced-apart conditions, before any connection has been established with the end of a beam, such as with the end of beam 24 which is specifically shown in FIG. 2. In dashed lines, tabs 10d, 12a are shown elastically deflected toward one another as will occur when an appropriate connection is established with central web 24c in beam 24.

FIG. 3 also illustrates tabs 10d, 12a in similar solid line and dashed line conditions, and further illustrates a condition wherein (in dash-double-dot lines) the illustrated end of beam 24 has been advanced toward these two tabs to insert web 24c in the space between tabs 10d, 12a.

In FIGS. 2 and 3, a dash-dot line 30 is indicative of the several lines along which nut-and-bolt assemblies, or fastening structure, (not specifically illustrated), are employed to tighten beam web 24c between tabs 10d, 12a. Line 30 can be considered herein to be a virtual, surrogate representative of such a fastener structure which, per se, is conventional in nature. In these nut-and-bolt connections, the long shanks of the bolts in the connections are extended though previously mentioned through-bores 21 that are provided in tabs 10d, 12a, and through aligned accommodating through bores (not shown) which are provided appropriately in beam web 24c. Tightening of the nut-and-bolt assemblies causes spring-resisted elastic deflection to occur in cantilevered tabs 10d, 12a, whereby they are drawn toward one another, and into appropriate tight contact with the opposite faces of web 24c. In FIG. 2 and 3, curved arrows 32, 34 illustrate and highlight the angular elastic deformation and bending which has just been described for tabs 10d, 12a, respectively.

Looking now more specifically at FIG. 4 along with FIGS. 2 and 3, FIG. 4 illustrates a condition wherein secure attachments through nut-and-bolt assemblies of the type generally mentioned have been established between the appropriate ends of beams 24, 26, 28 and connectors 10, 12, 14 and 16. In order to simplify FIG. 4, no beam end is shown attached to the confronting tabs in connectors 14, 16. With respect to illustrated beams 26, 28 in FIG. 4, their central webs, 26c, 28c, respectively, are shown properly connected between confronting tabs 10a, 16d and 12d, 14a, respectively. Previously mentioned deflection-indicating arrows 32, 34 are also shown in FIG. 4 with respect to elastic bending and deflection which occurs for tabs 10d, 12a, respectively. Similar unlabeled curved arrows are presented in FIG. 4 closely associated with deflected tabs 10a, 16d and 12d, 14a.

Deflection of these tabs causes the introduction of compressive forces in accordance with an important behavior of the present invention, which compressive forces are indicated by arrows, such as those shown at 36 in FIGS. 3 and 4, directed inwardly from the connectors through the outside associated faces of column 19, and inwardly therefrom generally toward the column's long axis 19a. Where the two tabs in a common (same) connector are deflected in order to establish connections with the central webs of beams, and this condition is clearly illustrated for connectors 10, 12 in FIG. 4, there is a telegraphing through the body of the connector between the tabs, as is illustrated by doubled-ended curved arrows 40 in FIG. 4, of stresses which cause the deflection of each tab to contribute in a way to compressive forces exerted into column 19 by the other tab.

Regardless of the exact manner of force transmission which takes place with use of the connectors of this invention, it is clearly observed that use of the connector of the invention creates, on connection of one or more beam ends, the development of a compressive preload between the connector and an associated column. This preload tends greatly to minimize shear loads which will ultimately be required to be borne by the weld connections existing between the connectors and a column when a building frame is completed, and the building associated with it is constructed and loading the frame with such forces.

Accordingly, a preferred embodiment of an angle-section connector, useable between a column and a beam, and a novel arrangement of such connectors, have been shown and described herein in detail, and a modified form of connector, designed to deal with columns that have different angular cross-sections has been generally outlined. Given this, it is appreciated that these disclosures will suggest to those skilled in the art other variations and modifications which may be made within the spirit of the present invention.

I claim:

1. A structural/column/beam interconnect arrangement comprising an elongate column having a long central axis, and plural, generally planar, outside faces, the planes of each two adjacent ones of which intersect one another to form a column corner which is characterized by a known angle, plural angle-section connectors each having an elongate body with a generally W-shaped cross-section as viewed along the long axis of a said body, with said cross-section being defined by a pair of central generally planar expanses which intersect along the length of the body to form an angular trough which is substantially defined by substantially same angle as said known angle, and for each said expanse, a joined substantially planar tab which extends away from said trough at substantially a right angle relative to the tab's directly associated expanse, said connectors being joined to the outside of said column at a common longitudinal location there along, and in a manner wherein each connector is trough-seated against the column, with the connector's trough complementarily wrapping around one of the column's corners, and with at least a pair of said connectors disposed adjacent one another in a manner wherein one of said tabs in each confronting faces, is spaced from, and substantially nominally parallels one of said tabs in the other, outwardly of a common face in the column, with the nominal space between said confronting, spaced tabs having a first known dimension, each of said confronting tabs having characteristics of an elastically deflectable cantilever element which can be resistibly deflected toward the other confronting tab effectively to diminish the effective spacing between the tabs, an elongate beam having a generally planar central web with a thickness possessing a second known dimension which is less than said first known dimension, and with one end of said central web received between said confronting tabs, and fastener structure securing said central web's end to and between said confronting tabs, and in a manner drawing said tabs elastically and resistibly toward one another to close tightly against opposite sides of said central web's end, thus to introduce a preload compression directed inwardly through said common column face generally toward the column's long central axis.

2. The interconnect arrangement of claim 1, wherein, with respect to the placement of said beam's central web for connection to and between a pair of next-adjacent columns, the arrangement is configured to allow for the vertical shifting of the beam into proper place for connection of its central web to and between pairs of spaced tabs, without any need for any lateral shifting of said column to allow for insertion of the beam between the columns.

* * * * *

UNITED STATES PATENT AND TRADEMARK OFFICE
CERTIFICATE OF CORRECTION

PATENT NO.         : 7,146,770 B2
APPLICATION NO.    : 10/699716
DATED              : December 12, 2006
INVENTOR(S)        : Robert J. Simmons It is certified that error appears in the above-identified patent and that said Letters Patent is hereby corrected as shown below:

Column 6, line 46, delete "a"

Column 6, line 56, change "there along" to --therealong--

Column 6, line 62, change "confronting" to --confrontingly--

Column 7, lines 2 and 12, change "resistibly" to --resistedly--.

Signed and Sealed this

Twenty-seventh Day of March, 2007

JON W. DUDAS
*Director of the United States Patent and Trademark Office*